(12) United States Patent
Nitsuma et al.

(10) Patent No.: US 10,011,201 B2
(45) Date of Patent: Jul. 3, 2018

(54) VEHICLE SEAT

(71) Applicant: TS TECH CO., LTD., Asaka-shi, Saitama (JP)

(72) Inventors: Kenichi Nitsuma, Tochigi (JP); Masaya Furuta, Tochigi (JP)

(73) Assignee: TS Tech Co., Ltd., Saitama (JP)

( * ) Notice: Subject to any disclaimer, the term of this patent is extended or adjusted under 35 U.S.C. 154(b) by 202 days.

(21) Appl. No.: 14/968,160

(22) Filed: Dec. 14, 2015

(65) Prior Publication Data

US 2016/0096453 A1    Apr. 7, 2016

Related U.S. Application Data

(62) Division of application No. 14/567,285, filed on Dec. 11, 2014, now Pat. No. 9,211,819, which is a division
(Continued)

(30) Foreign Application Priority Data

Dec. 28, 2009   (JP) .................................. 2009-298026

(51) Int. Cl.
*B60N 2/42*    (2006.01)
*B60N 2/427*    (2006.01)
(Continued)

(52) U.S. Cl.
CPC ....... *B60N 2/4228* (2013.01); *B60N 2/42745* (2013.01); *B60N 2/42781* (2013.01); *B60N 2/68* (2013.01); *B60N 2/888* (2018.02)

(58) Field of Classification Search
CPC ..... B60N 2/686; B60N 2/4221; B60N 2/4263
(Continued)

(56) References Cited

U.S. PATENT DOCUMENTS

| 3,797,858 A | 3/1974 | Yamada |
| 5,088,790 A | 2/1992 | Wainwright et al. |
| (Continued) | | |

FOREIGN PATENT DOCUMENTS

| CN | 1163560 A | 10/1997 |
| CN | 101212918 A | 7/2008 |
| (Continued) | | |

OTHER PUBLICATIONS

Office Action issued in related application CN 201610576023.6, dated Feb. 13, 2018, with machine generated English language translation, 14 pages.

*Primary Examiner* — Sarah B McPartlin
(74) *Attorney, Agent, or Firm* — Drinker Biddle & Reath LLP

(57) ABSTRACT

Provided is a vehicle seat which has a simple structure, prevents the lower back region of an occupant from sinking into the seat back, induces backward rotation of the entire upper body when a rear-end collision occurs, and reduces the degree to which the neck region of the occupant independently tilts backward, and is therefore able to effectively reduce the load on the neck region and so on of the occupant. A vehicle seat is provided with a neck-burden reduction element that, during a rear-end collision, causes a greater amount of backward movement of a connection point between the neck region and a torso region of the occupant than the amount of backward movement of a lower torso region of the occupant, and causes an upper torso region of the occupant to sink into the seat back.

11 Claims, 12 Drawing Sheets

Related U.S. Application Data of application No. 13/519,639, filed as application No. PCT/JP2010/073183 on Dec. 22, 2010, now Pat. No. 8,911,014.

(51) Int. Cl.
 *B60N 2/68* (2006.01)
 *B60N 2/888* (2018.01)

(58) Field of Classification Search
 USPC .......................... 297/216.13, 216.14, 216.12
 See application file for complete search history.

(56) References Cited

U.S. PATENT DOCUMENTS

| | | | |
|---|---|---|---|
| 5,626,396 | A | 5/1997 | Kuragano et al. |
| 5,716,098 | A | 2/1998 | Lance |
| 7,066,552 | B2 | 6/2006 | Yoshida |
| 7,513,574 | B2 * | 4/2009 | Nagayama ............... A47C 7/40 |
| | | | 297/216.13 |
| 8,434,818 | B2 | 5/2013 | Humer et al. |
| 2002/0030392 | A1 | 3/2002 | Kitagawa |
| 2004/0195873 | A1 * | 10/2004 | Saberan ............... B60N 2/4235 |
| | | | 297/216.13 |
| 2005/0264053 | A1 | 12/2005 | Saberan et al. |
| 2009/0001786 | A1 | 1/2009 | Haglund |
| 2011/0148157 | A1 | 6/2011 | Braun-Fischer |
| 2012/0049587 | A1 | 3/2012 | Suzuki et al. |

FOREIGN PATENT DOCUMENTS

| | | |
|---|---|---|
| CN | 100466942 C | 3/2009 |
| EP | 1 803 605 A1 | 7/2007 |
| JP | 10-181400 A | 7/1998 |
| JP | 10-258663 A | 9/1998 |
| JP | 2003-341401 A | 12/2003 |
| JP | 2003-341402 A | 12/2003 |
| JP | 2004-016708 A | 1/2004 |
| JP | 2005-126053 A | 5/2005 |
| JP | 2009-023517 A | 2/2009 |
| WO | 96/04878 A1 | 2/1996 |
| WO | 2004/086909 A1 | 10/2004 |
| WO | 2006/122420 A1 | 11/2006 |

* cited by examiner

VEHICLE SEAT

CROSS REFERENCE TO RELATED APPLICATIONS

This application is a divisional application of U.S. patent application Ser. No. 14/567,285, filed Dec. 11, 2014, now U.S. Pat. No. 9,211,819, which is a divisional application of U.S. patent application Ser. No. 13/519,639, filed Jun. 28, 2012, now U.S. Pat. No. 8,911,014, which is the U.S. national phase of the International Patent Application No. PCT/JP2010/073183, filed Dec. 22, 2010, which claims the benefit of Japanese Patent Application No. 2009-298026, filed Dec. 28, 2009, the disclosures of which are herein incorporated by reference in their entirety.

BACKGROUND

The invention relates to vehicle seats. Disclosed herein are embodiments of vehicle seats that reduce the load on occupants during a rear-end collision.

During a rear-end collision, where the rear of a vehicle such as an automobile is impacted, the vehicle experiences a large collision while traveling in reverse, or the like, there is a risk that the neck region (neck) of an occupant will receive a large load. Generally speaking, the primary cause of such a load is that the head region alone suddenly moves backward relative to the chest region of the seated occupant, which causes the neck region to bend to an excessive degree. In other words, during a rear-end collision, a load is placed on the neck region due to the head region of the seated occupant tilting backward suddenly from inertia.

Accordingly, vehicle seats in automobiles and the like have conventionally been provided with headrests, located on the upper area of the seat back (seating portion), that support the head region of the occupant in order to protect the head region, neck region, and so on of the occupant from impacts during rear-end collisions to reduce the load on the neck region.

However, it is difficult for a headrest installed in a fixed state to prevent the head region from sudden backward movement during a rear-end collision. In other words, unless the head region of the occupant is supported by quickly reducing the gap between the head region and the headrest when a rear-end collision occurs, there are cases where the head region will suddenly move backward, and the load exerted on the neck region cannot be reduced sufficiently as a result.

To solve this problem, active headrests have been proposed, in which, during a rear-end collision, the backward movement of the load of the occupant is utilized, so that the headrest is moved forward in order to support the head region of the occupant and suppress the load exerted on the neck region (see, for example, Japanese Patent Document No. 2003-341402 ("the '402 Patent Document")).

Furthermore, a technique has been proposed where, in a vehicle seat provided with a seat back that supports a seat back cushion using a seat back frame including side frames, a pressure receiving member is installed by providing mobile link members between the side frames; when a large impact load is exerted on an occupant during a rear-end collision, the link members pivot and the pressure receiving member is moved backward, which causes the occupant to sink toward the seat back, or in other words, toward the rear, thus bringing the head region closer to the headrest (see, for example, Japanese Patent Document No. 2009-023517 ("the '517 Patent Document")).

With the technique disclosed in the '402 Patent Document, when the occupant moves backward due to inertia during a rear-end collision, the load of the occupant is exerted on a mobile plate provided in the rear of the seat, and the headrest moves forward in tandem with the mobile plate moving backward, thus dissipating the load exerted on the occupant.

As described above, with the technique disclosed in the '402 Patent Document, the occupant moves backward during a rear-end collision, and at that time, the load is received by the mobile plate; the headrest is moved forward in tandem with backward movement of the mobile plate.

On the other hand, with the technique disclosed in the '517 Patent Document, the pressure receiving member is attached to the side frames of the seat via the link members, and when a rear-end collision occurs, the pressure receiving member moves significantly backward under the load of the occupant. This configuration allows the upper body of the occupant, including the lower back region, to sink into the seat back without the headrest moving forward, and thus the head region and back are simultaneously supported by the headrest and the seat back, respectively; this prevents the head region from suddenly moving backward and thus makes it possible to reduce the burden on the neck region.

In this manner, the stated the '402 Patent Document and the '517 Patent Document disclose vehicle seats provided with configurations in which the head region or the neck region is supported from behind by the headrest by causing the back of the occupant to sink backward during a rear-end collision. These techniques have merits in that they make it easy for the head region of the occupant to make contact with the headrest by causing the back region of the occupant to sink backward, which prevents the head region from suddenly moving backward.

If, when a rear-end collision has occurred, the upper body of the occupant can be tilted backward integrally, or in other words, if the head region, neck region, and torso region can be tilted backward while maintaining the relative positions therebetween, the head region will not move backward by itself. This makes it possible to suppress the burden on the neck region, but in the stated techniques, the seat back restricts the backward movement of the torso region of the occupant. Accordingly, because the amount of backward movement of the connection point between the neck region in the torso region relative to the amount of backward movement of the head region is suppressed, there has been a risk that the angle at the connection location between the head region and the neck region has changed between when normally sitting and when a rear-end collision has occurred, placing a burden on the neck region.

With techniques such as that disclosed in '402 Patent Document, in which the headrest moves to make contact with the head region of the occupant, it is necessary to provide a separate movement mechanism for the headrest in order to cause the headrest and the pressure receiving member to move in tandem, which is problematic in that it not only complicates the structure and increases costs, but also increases the weight of the seat as a whole. It has also been necessary to provide a mobile portion in the seat back frame for moving the headrest, which has been problematic in that it reduces the rigidity of the frame.

With the technique disclosed in the '517 Patent Document, the mechanism for attaching the pressure receiving member to the side frames is complicated, and there is a problem in that a large number of components is required to attach the pressure receiving member.

SUMMARY

Various embodiments of the invention provide a vehicle seat capable of effectively reducing the load on an occupant during a rear-end collision, in which the burden on the neck region of the occupant can be reduced by suppressing a change in the angle of the head region of the occupant between when normally sitting and during a rear-end collision. These embodiments can provide a vehicle seat having a simple configuration and a light weight at a low cost.

The problems noted above may be solved by providing a neck-burden reduction element that, during a rear-end collision, causes a greater amount of backward movement of a connection point between a neck region and a torso region of an occupant than the amount of backward movement of a lower torso region of the occupant, and causes an upper torso region of the occupant to sink into a seat back.

Through this, when the occupant moves backward during a rear-end collision, the upper torso region of the occupant can be caused to advance toward the seat back, and furthermore, an amount of backward movement can be ensured for the connection point between the torso region and the neck region. As a result, as to the angle formed by a line connecting the top of the head region to the connection point between the head region and the neck region and a line connecting the connection point between the head region and the neck region to the connection point between the neck region and the torso region, the angle can be suppressed from changing from when the occupant is normally seated to when a rear-end collision has occurred, which makes it possible to reduce the burden on the neck region.

According to an embodiment the neck-burden reduction element may cause the connection point between the neck region and the torso region to move to a location that is rear of a line that connects the connection point between the head region and the neck region of the occupant to a lower back region of the occupant.

Through this, a greater amount of backward movement can be ensured for the connection point between the torso region and the neck region of the occupant. As a result, with respect to the angle formed by a line connecting the top of the head region to the connection point between the head region and the neck region and a line connecting the connection point between the head region and the neck region to the neck region and the torso region, the angle can be suppressed from changing from when the occupant is normally seated to when a rear-end collision has occurred, which makes it possible to further reduce the burden on the neck region.

In an embodiment, the neck-burden reduction element may comprise a movement amount suppression member that suppresses backward movement of the lower torso region.

In this manner, the movement of occupant can be induced to tilt backward by providing the movement amount suppression member that stops the occupant from moving backward. As a result, there is a greater amount of backward movement of the upper torso region, which increases the effect of reducing the burden on the neck region.

In an embodiment, the neck-burden reduction element may cause a greater amount of backward movement in the upper torso region than the amount of backward movement in the center of the torso region.

Through this, an amount of backward movement can be ensured for the connection point between the torso region and the neck region of the occupant, which makes it possible to suppress a change in the angle of the connection point between the neck region and the torso region; this in turn makes it possible to further reduce the burden placed on the neck region.

In an embodiment, the vehicle seat may include a seat back frame including at least side portions located on both sides of the seat back frame, an upper portion disposed in an upper area of the seat back frame, and a lower portion disposed in a lower area of the seat back frame, as well as a headrest disposed in an upper area of the seat back frame; for the lower portion to include a lower frame extending between the side portions and the neck-burden reduction element that is anchored to the lower frame, extends in the horizontal direction, and is separated from the side portions by a predetermined distance; for the neck-burden reduction element to comprise a lower back advancement inhibiting member disposed in a position behind the lower back region; and for the lower back advancement inhibiting member to be anchored to the lower frame to be continuous with an upper and lower area of the lower frame and to be disposed to bulge forward further than the lower frame.

By providing the lower back advancement inhibiting member in the lower frame, or in other words, in a location that corresponds to the lower back region of the occupant in this manner, when the upper body of the occupant moves backward during a rear-end collision, the lower back region is stopped by the lower back advancement inhibiting member, and thus the lower back region sinks less relative to the seat back. According to this configuration, the backward movement of the lower back region is suppressed, and furthermore, the upper torso region (that is, an area corresponding to the shoulders) moves backward; accordingly, it is possible to suppress a change in the angle at the connection location between the head region and the neck region between when the occupant is seated normally and when a rear-end collision has occurred. As a result, it is possible to reduce the load placed on the neck region.

Accordingly, it is possible to effectively suppress the load on the neck region and the like of the occupant during a rear-end collision simply by employing a configuration in which the lower back advancement inhibiting member with a simple configuration is provided in a lower area of the seat, rather than using a complicated mechanism such as a mechanism that causes the headrest to move, a mechanism that causes the upper body of the occupant to sink, or the like.

Rather than providing a complicated mechanism, the vehicle seat described herein may be configured simply to include the lower back advancement inhibiting member. Thus, the load placed on the occupant during a rear-end collision can be reduced with a small number of components. Accordingly, it is possible to provide a vehicle seat with a simple configuration and lightweight.

In addition, because the lower back advancement inhibiting member is supported at the upper area and the lower area of the lower frame, it is possible to achieve stronger joints, which in turn makes it possible to provide a vehicle seat capable of sufficiently withstanding loads even in the case where an excessive load has been exerted thereon due to the backward movement of the occupant.

According to an embodiment, the movement amount suppression member serving as the lower back advancement inhibiting member may be formed as a hollow body.

By forming the lower back advancement inhibiting member as a hollow body in this manner, the lower back advancement inhibiting member does not make contact with the other components configuring the seat frame, and thus effectively conserves space. Furthermore, because the lower back advancement inhibiting member comprises a hollow body, it is possible to suppress a weight increase and thus achieve a design with a lighter weight.

According to an embodiment, the movement amount suppression member serving as the lower back advancement inhibiting member may be provided with a relief area in the vicinity of a location that corresponds to the spine of the occupant.

By employing such a configuration, the area corresponding to the spine (spinal column) of the occupant does not make contact with the lower back advancement inhibiting member. Accordingly, even in the case where the lower back region of the occupant has suddenly moved backward during a rear-end collision, the load placed on the spine of the occupant is low.

According to an embodiment, the movement amount suppression member serving as the lower back advancement inhibiting member may further include an upper surface provided in an upper area of the movement amount suppression member and a lower surface provided in a lower area of the movement amount suppression member; and for an impact absorption portion to be provided in at least one of the upper surface and the lower surface.

By forming the impact absorption portion as, for example, a groove that extends in the horizontal direction of the lower back advancement inhibiting member in this manner, when an impact greater than that which the impact absorption portion has been set for occurs during a rear-end collision, the impact absorption portion deforms at the area corresponding to that groove when the occupant bears on the lower back advancement inhibiting member, thus absorbing the load. By employing a configuration that includes the impact absorption portion in this manner, it is possible to effectively absorb an excessive load occurring during a rear-end collision.

According to at least one embodiment discussed above, the upper torso region of the occupant is caused to sink toward the seat back during a rear-end collision, and thus an amount of backward movement can be ensured for the connection point between the neck region and the torso region. Through this, a change in the angle at the connection point between the head region and the neck region of the occupant is suppressed, which makes it possible to provide a vehicle seat capable of reducing the burden on the neck region of the occupant.

According to at least one embodiment discussed above, it is possible to ensure a greater amount of backward movement for the connection point between the neck region and the torso region of the occupant, which makes it possible to provide a vehicle seat capable of reducing the load on the neck region during a rear-end collision.

According to at least one embodiment discussed above, the movement of occupant is induced to tilt backward during a rear-end collision, which makes it possible to provide a vehicle seat that further suppresses the load exerted on the neck region.

According to at least one embodiment discussed above, an amount of backward movement is ensured for the connection point between the torso region and the neck region of the occupant, which makes it possible to provide a vehicle seat that reduces the burden on the neck region.

According to at least one embodiment discussed above, it is possible to provide a vehicle seat that causes the entire upper body of the occupant including the head region to tilt backward in an integrated manner during a rear-end collision. In addition, it is possible to provide a vehicle seat capable of suppressing the load exerted on the neck region during a rear-end collision using a simple configuration without a complicated mechanism. Furthermore, it is possible to provide a vehicle seat with a simple configuration and lightweight. Further still, it is possible to provide a vehicle seat in which the lower back advancement inhibiting member is more strongly anchored.

According to at least one embodiment discussed above, the lower back advancement inhibiting member is formed as a hollow body, and it is thus possible to provide a vehicle seat with a lighter weight.

According to at least one embodiment discussed above, the spine of the occupant does not make contact with the lower back advancement inhibiting member, and it is thus possible to cause the upper body to tilt backward in an integrated manner without a load being placed on the spine of the occupant even in the case where the lower back region of the occupant has moved backward.

According to at least one embodiment discussed above, the impact absorption portion is provided, and when an area that deforms easily is formed in part of the lower back advancement inhibiting member, the impact absorption portion deforms when the lower back region of the occupant suddenly moves backward. As a result, it is possible to absorb and dissipate impacts when the occupant moves backward.

As described thus far, by providing the lower back advancement inhibiting member with a simple configuration, the lower back region is inhibited from sinking and the upper body readily tilts backward in an integrated fashion; the body of the occupant thus tilts backward while the seating posture is maintained, and a head region that makes contact with the headrest. Accordingly, it is possible to provide a vehicle seat with a lighter weight and lower cost, without a complicated mechanism such as a mechanism that causes the headrest to move forward, a mechanism that causes the body of the occupant to sink backward, or the like.

BRIEF DESCRIPTION OF THE DRAWINGS

The following drawings illustrate various embodiments of the invention.

DETAILED DESCRIPTION

Hereinafter, embodiments of the present invention will be described with reference to the drawings. Note that the constituent elements, the positions thereof, and so on indicated hereinafter are not intended to limit the present invention, and it goes without saying that many variations can be made within the scope of the present invention. In this specification, "vehicle" refers to a moving vehicle in which a seat can be installed, including a surface-driving vehicle that includes wheels such as an automobile, a train, or the like, as well as airplanes, boats, and so on that do not travel on a surface.

Figure 4:
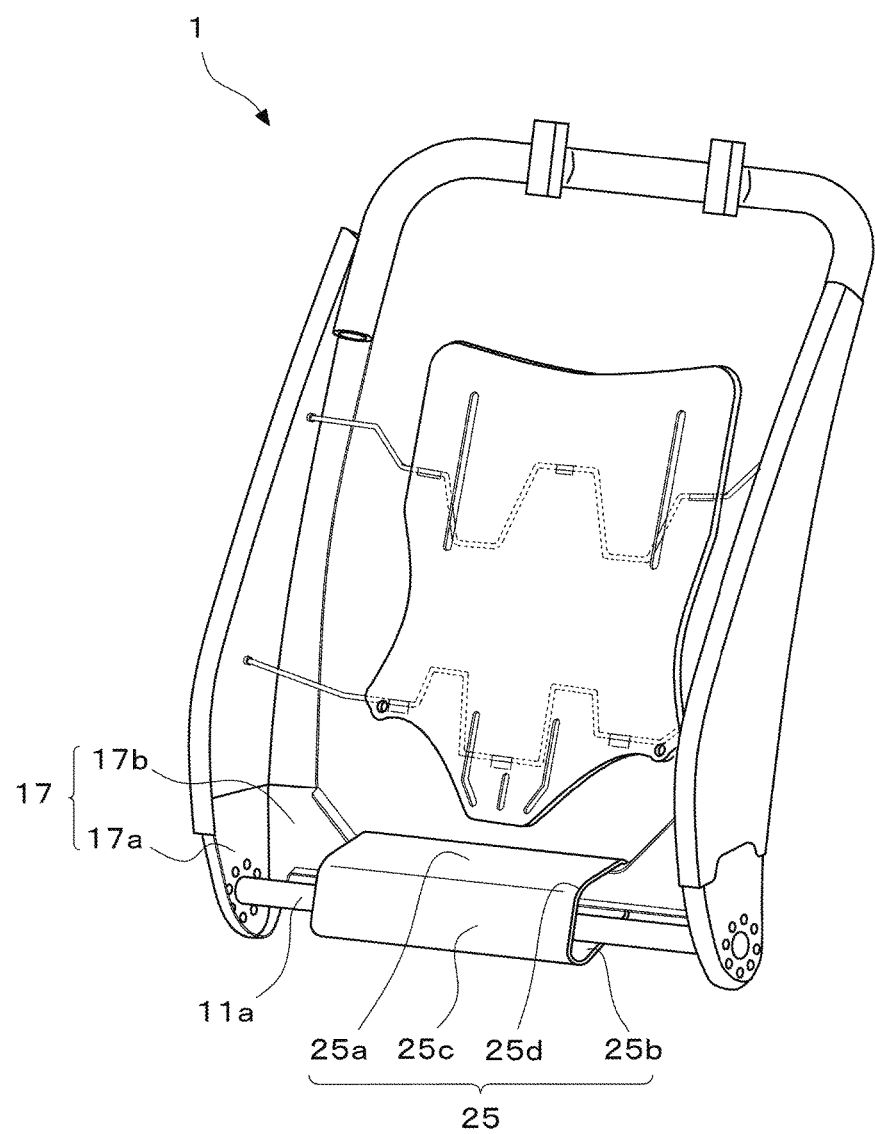
FIG. 4 is an overall perspective view of a seat back frame according to the first embodiment of the present invention.
Figure 5:
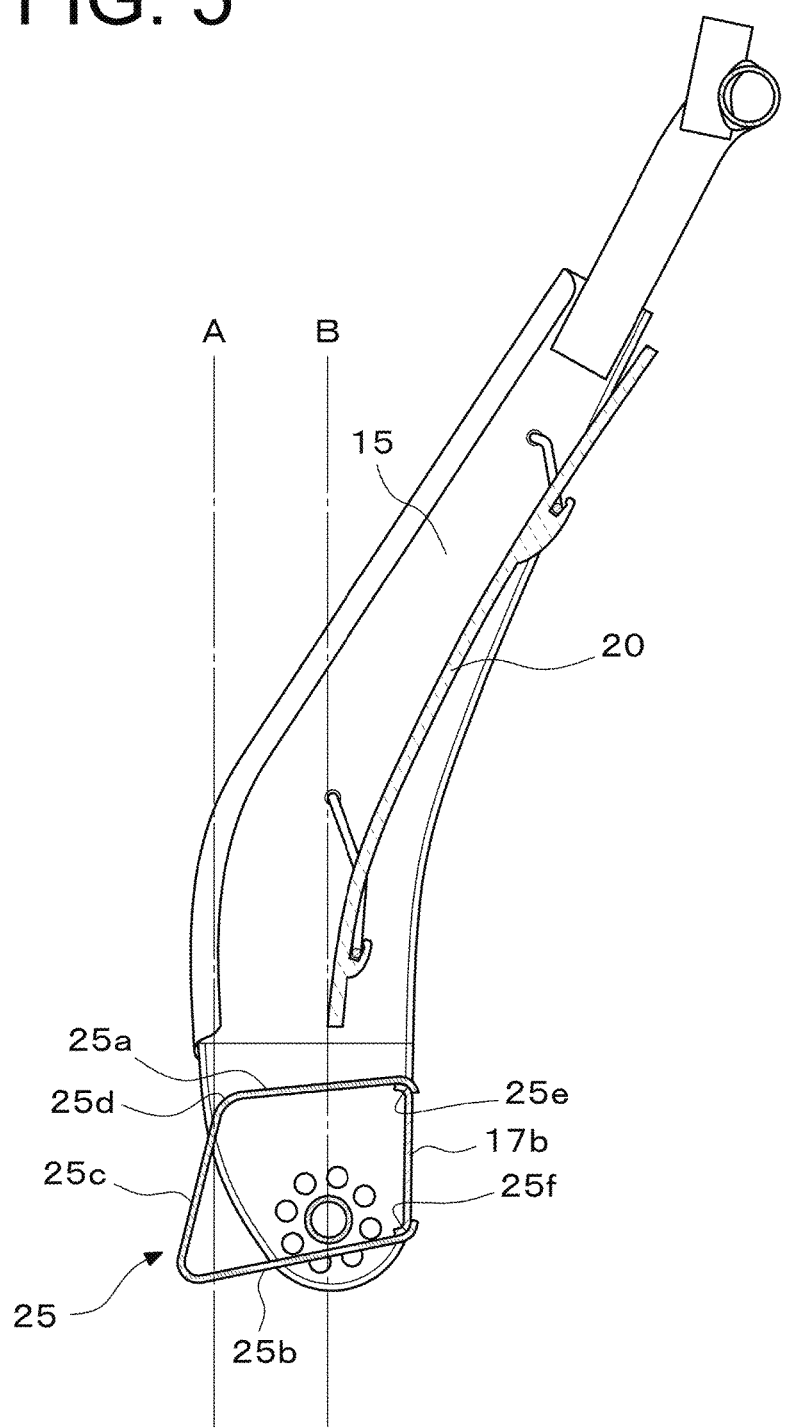
FIG. 5 is an explanatory side-view diagram illustrating a side frame and the lower back advancement inhibiting member according to the first embodiment of the present invention.
Figure 6:
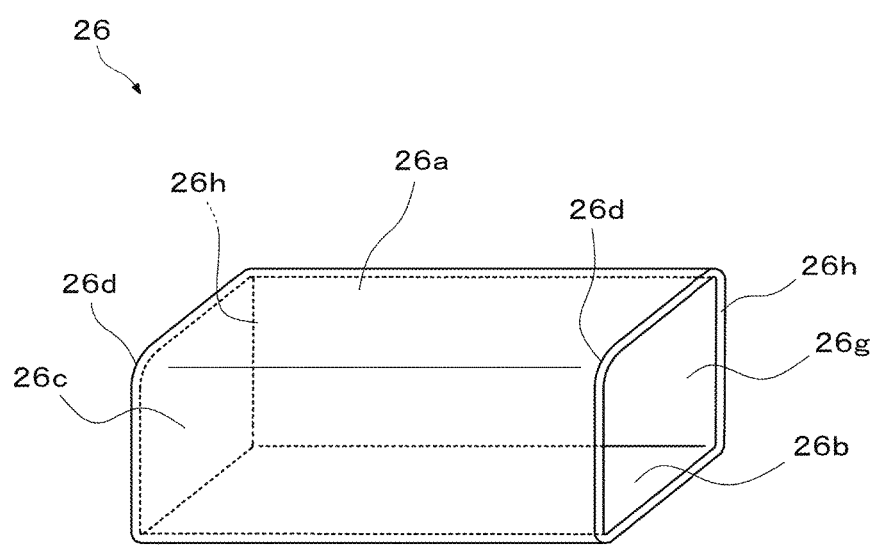
FIG. 6 is an overall perspective view of a lower back advancement inhibiting member according to a second embodiment of the present invention.
Figure 7:
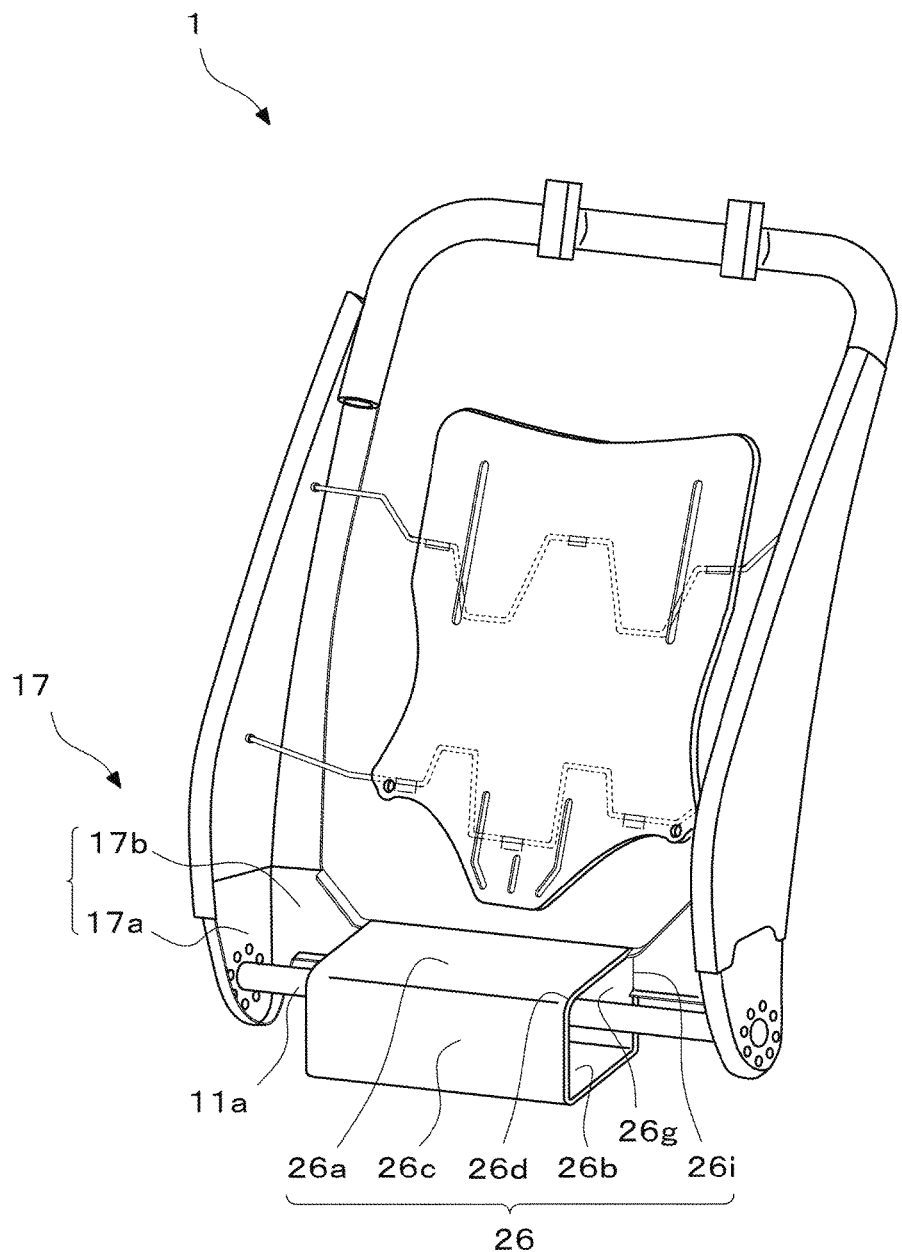
FIG. 7 is an overall perspective view of a seat back frame according to the second embodiment of the present invention.
Figure 8:
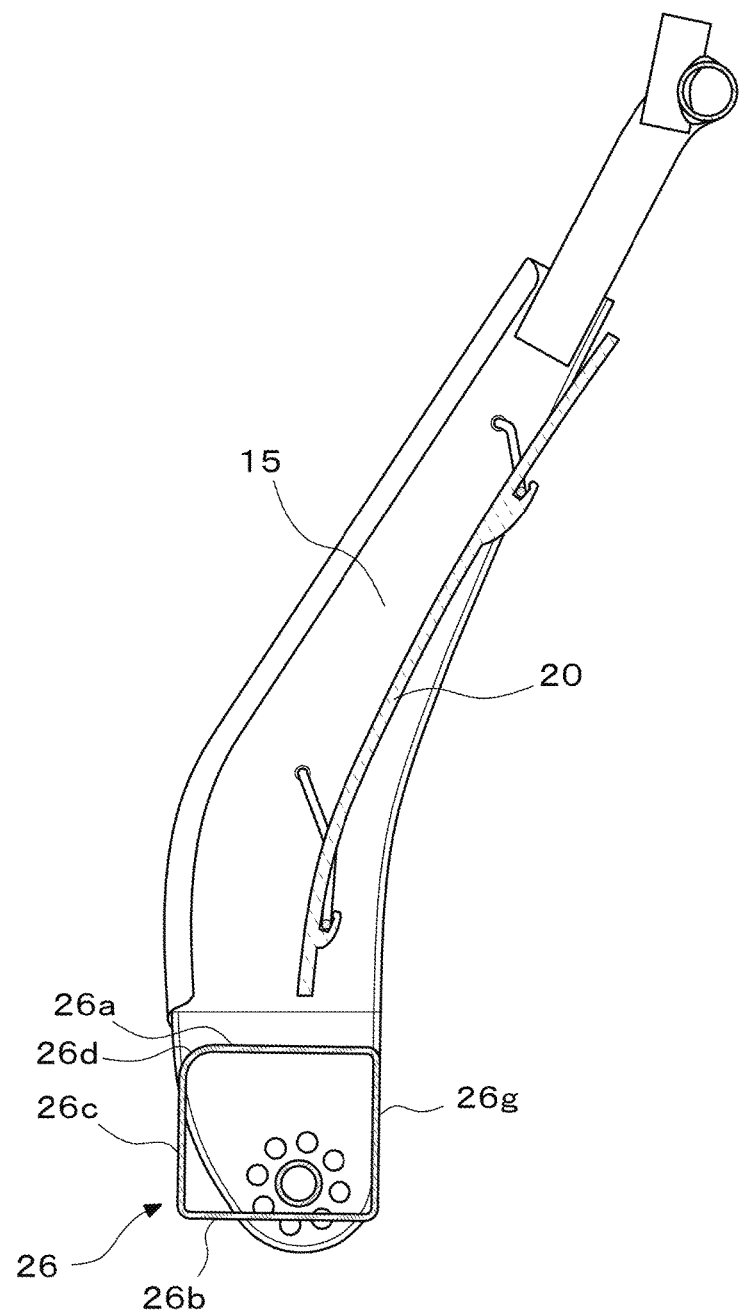
FIG. 8 is an explanatory side-view diagram illustrating a side frame and the lower back advancement inhibiting member according to the second embodiment of the present invention.
Figure 9:
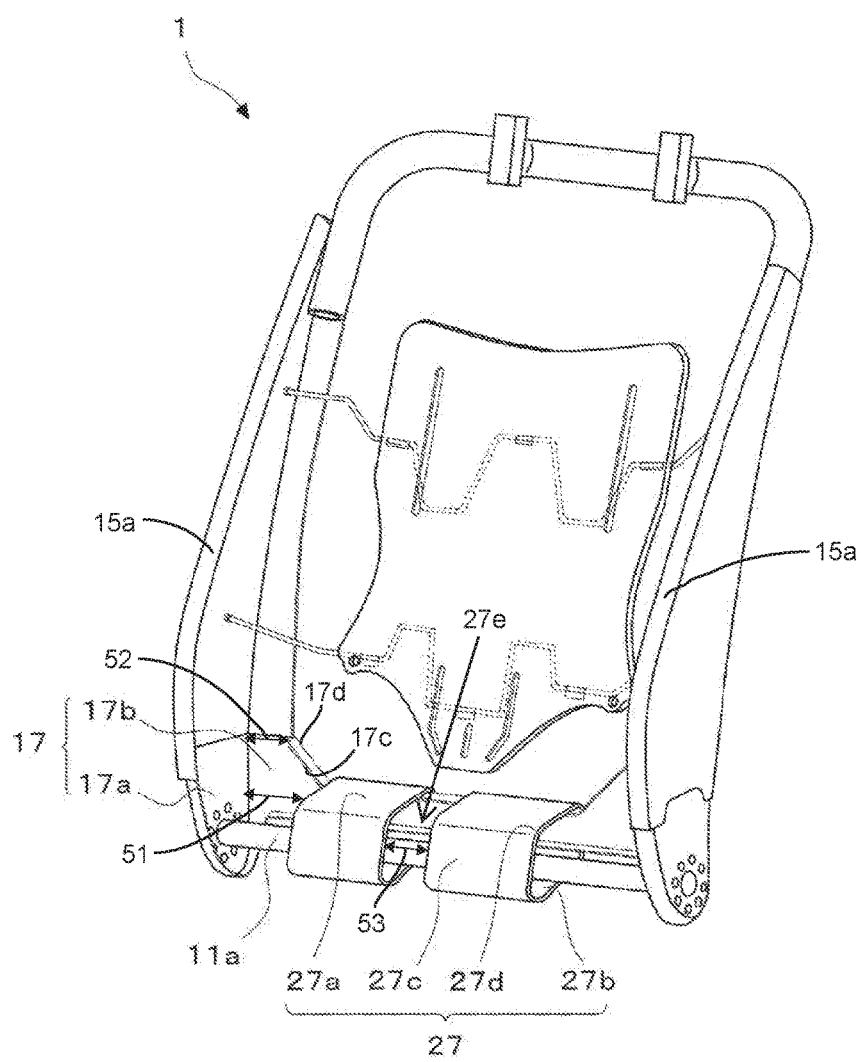
FIG. 9 is an overall perspective view of a seat back frame according to a third embodiment of the present invention.
Figure 10:
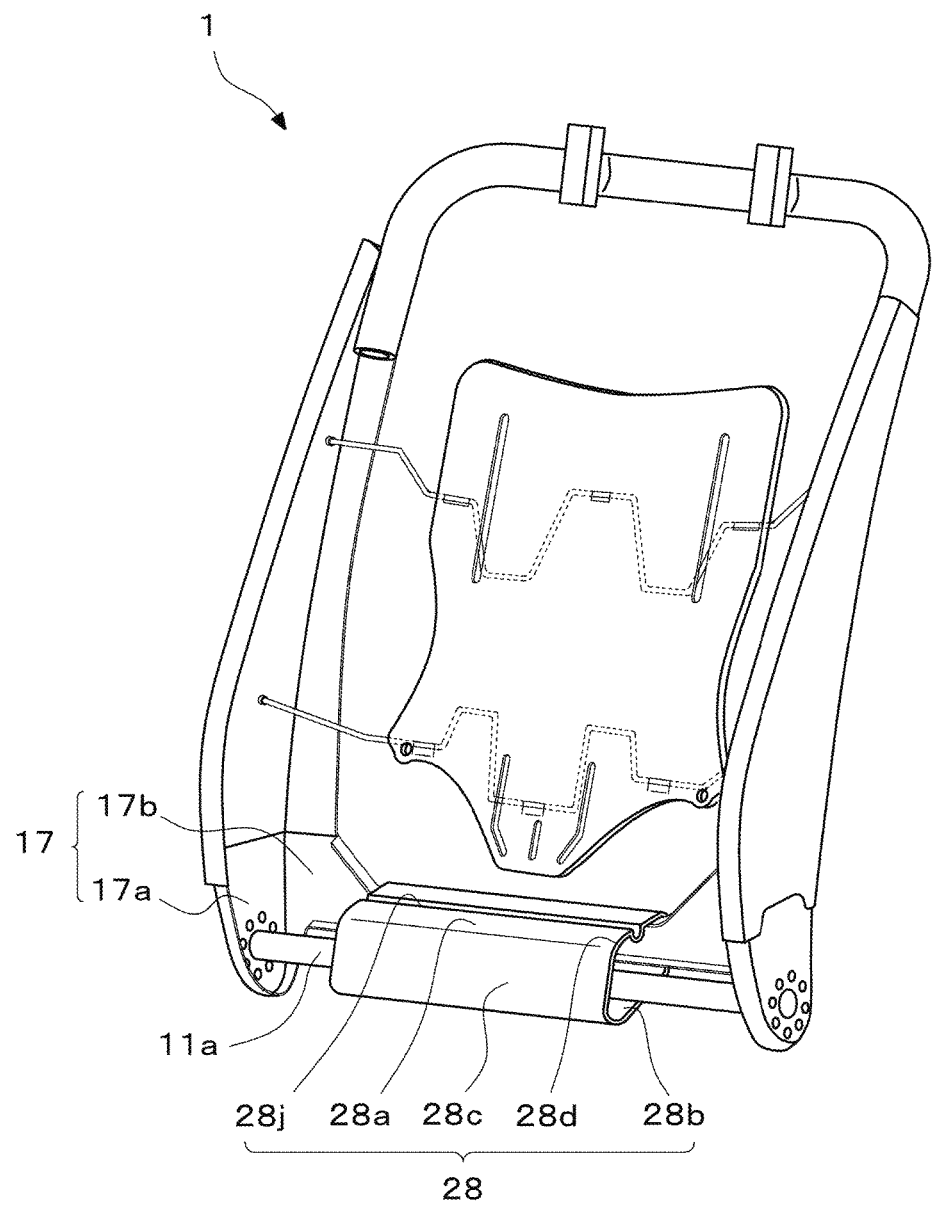
FIG. 10 is an overall perspective view of a seat back frame according to a fourth embodiment of the present invention.

FIGS. 1 through 10 illustrate embodiments of the present invention. FIGS. 2 through 5 illustrate a first embodiment of the present invention; FIGS. 6 through 8 illustrate a second embodiment of the present invention; FIG. 9 illustrates a third embodiment of the present invention; and FIG. 10 illustrates a fourth embodiment of the present invention.

First Embodiment

Figure 1:
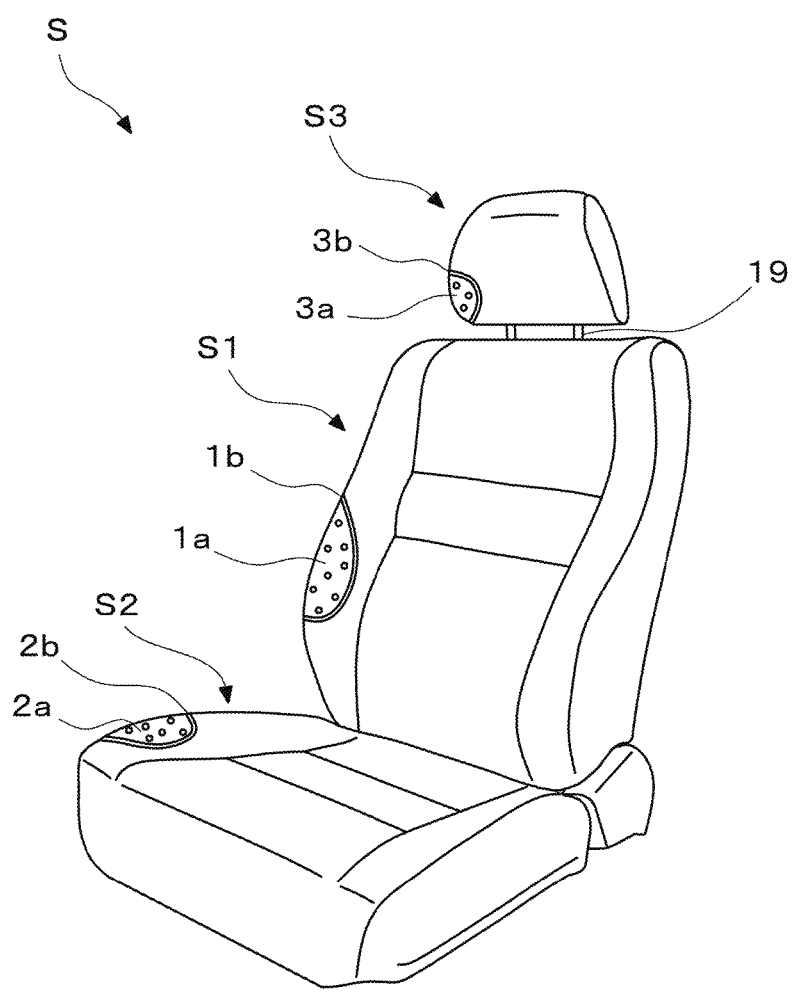
FIG. 1 is an overall perspective view of a seat according to embodiments of the present invention.

A vehicle seat S according to the present first embodiment, as shown in FIG. 1, comprises a seat back S1 (a back portion), a seating portion S2, and a headrest S3; the seat back S1 (back portion) and the seating portion S2 include cushion pads 1a and 2a on a seat frame F, and are covered by skin materials 1b and 2b. Accordingly, the cushion pad 1a is also installed on a lower back advancement inhibiting member 25, which will be described later, and is covered by the skin material 1b. The headrest S3 is formed by providing padding material 3a on a headrest pillar 19 and covering it with a skin material 3b.

Figure 2:
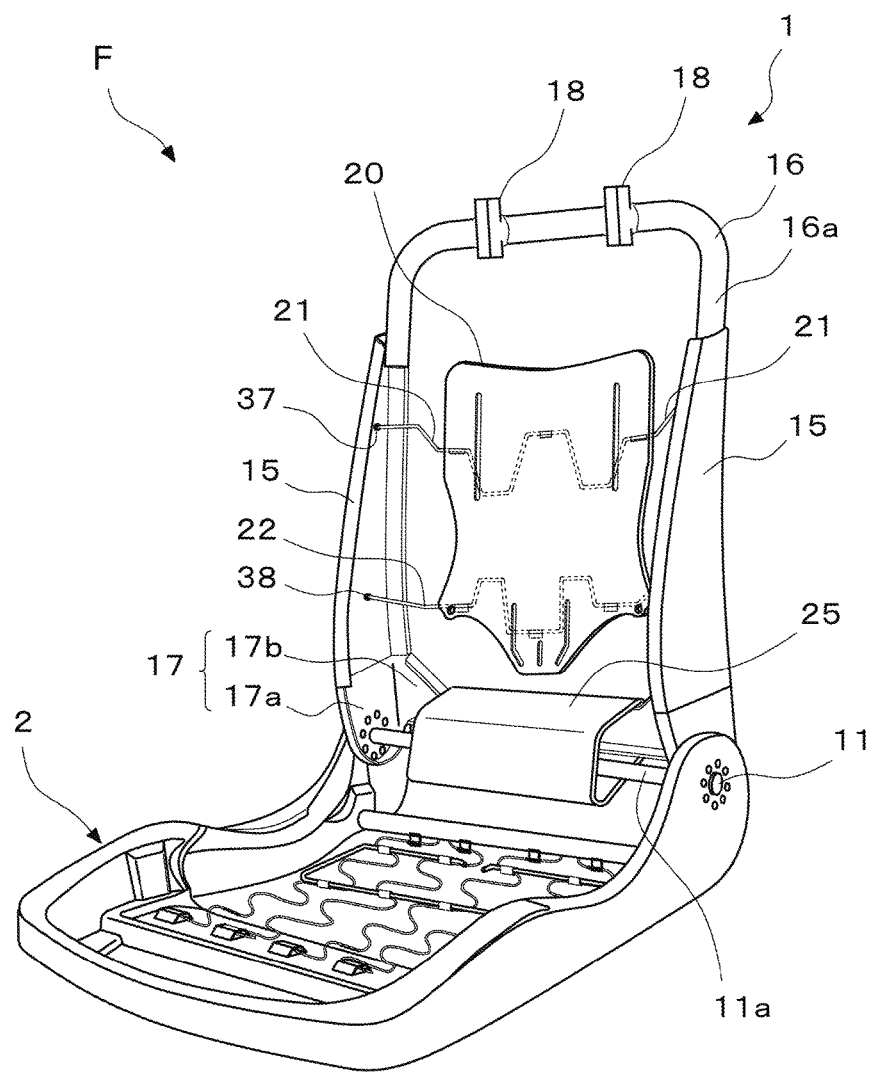
FIG. 2 is an overall perspective view of a seat frame according to a first embodiment of the present invention.

The seat frame F of the vehicle seat S, as shown in FIG. 2, comprises a seat back frame 1 that configures the seat back S1 and a seating frame 2 that configures the seating portion S2.

The seating frame 2 has the cushion pad 2a installed as mentioned above, and is configured so that the cushion pad 2a is covered by the skin material 2b from above and supports an occupant from below. The seating frame 2 is supported by leg portions, and an inner rail (not shown) is attached to these leg portions; the seating frame 2 is provided between outer rails disposed on the vehicle floor, as a sliding type of which position can be adjusted forward and backward. The rear end of the seating frame 2 is linked to the seat back frame 1 through a reclining mechanism 11.

The seat back S1 includes the cushion pad 1a on the seat back frame 1 as mentioned above, and the cushion pad 1a is covered by the skin material 1b from above; the seat back S1 thus supports the back of the occupant from the rear. In the present embodiment, the seat back frame 1 is, as shown in FIG. 2, an approximately rectangular frame member, and includes side portions, an upper portion, and a lower portion.

The side portions are disposed at a distance from each other in the right and left directions to set the width of the seat back, and have two side frames 15 extending in the vertical direction. An upper frame 16 that links the side frames 15 at their upper ends extends upward from the side portions, thus configuring the upper portion.

Meanwhile, the lower portion of the seat back frame 1 is formed by linking the lower ends of the side frames 15 by a lower frame 17. The lower frame 17 includes extension portions 17a that are linked to the bottoms of the side frames 15 and extend downward, and a middle portion 17b that connects the extension portions 17a on both sides.

Although the seat back frame 1 according to the present embodiment is formed of separate components, or the side frames 15, the upper frame 16, and the lower frame 17, the seat back frame 1 can also be formed of a single pipe frame, a single plate-shaped frame, or the like.

The reclining mechanism 11 includes a reclining shaft 11a that at least follows the rotational axis of the reclining mechanism 11; the reclining shaft 11a is disposed to pass through holes (not shown) provided in the extension portions 17a of the lower frame 17, and to extend toward the side portions of the seat frame F.

The lower back advancement inhibiting member 25, serving as a neck-burden reduction element, is provided in the lower frame 17 so that a portion thereof corresponding to the location behind the lower back region of the occupant bulges toward the lower back region, or in other words, the lower back advancement inhibiting member 25 is protrudingly disposed toward the front of the seat frame F. The lower back advancement inhibiting member 25 is formed to be fixedly jointed to, or formed integrally with, the middle portion 17b of the lower frame 17, and is designed as a hollow cylinder or a hollow rectangular column. Because the reclining shaft 11a is disposed to pass through the hollow interior of the lower back advancement inhibiting member 25, the lower back advancement inhibiting member 25 will not come into contact with the reclining shaft 11a and inhibit the rotation of the reclining shaft 11a.

In this manner, it is favorable for the reclining mechanism 11 disposed below the seat back frame 1 to be further provided, and for the lower back advancement inhibiting member 25 to be disposed bulging forward more than the rotational axis of the reclining mechanism 11.

Therefore, by providing the lower back advancement inhibiting member 25 in a location that is forward from the rotational axis of the reclining mechanism 11, or in other words, forward from the location corresponding to the reclining shaft 11a, the lower back region of the occupant will make contact with the lower back advancement inhibiting member 25 more quickly when the occupant moves backward. As a result, the head region of the occupant can be caused to make contact with the headrest S3 more quickly.

A cushion material (the cushion pad 1a) is disposed on the lower back advancement inhibiting member 25, and the lower back advancement inhibiting member 25 is provided in a location that corresponds to the lower back region of the occupant, with the cushion pad 1a and the skin material 1b located therebetween. The lower back advancement inhibiting member 25 that bulges forward in this manner stops the lower back region of the occupant from sinking into the seat back S1, with the cushion pad 1a and the skin material 1b interposed therebetween. As a result, during a rear-end collision, the entire upper body of the occupant can be tilted backward, thus preventing the head region from suddenly moving backward alone. Therefore, the load on the neck region of the occupant during a rear-end collision can be suppressed simply by providing the lower back advancement inhibiting member 25, which has a simple configuration as described above.

As shown in FIG. 2, the upper frame 16 is an approximately U-shaped member, and side surfaces 16a of the upper frame 16 are disposed to partially overlap with the side frames 15 and are then fixedly jointed to the side frames 15 at the overlapping portions.

The headrest S3 is disposed upon the upper frame 16 that configures the upper portion. As described earlier, the headrest S3 is configured by providing a padding material 3a around a core (not shown) and covering the outside of the padding material 3a with the skin material 3b. Pillar support portions 18 are provided in the upper frame 16. The headrest pillar 19 (see FIG. 1) that supports the headrest S3 is attached to the pillar support portions 18 via guide members (not shown), and the headrest S3 is attachable in this manner.

Although the present embodiment describes an example in which the seat back S1 and the headrest S3 are separate entities, a bucket type seat in which the seat back S1 and the headrest S3 are formed as an integrated entity, may be employed as well.

As described earlier, the side frames 15, serving as side portions that configure part of the seat back frame 1, are configured having a predetermined length in the vertical direction, and are disposed to oppose each other with a predetermined interval therebetween in the horizontal direction. A posture holding member 20, which supports the cushion pad 1a from the rear, is disposed within the seat back frame 1 (between the two side frames 15) and in the inner region of the seat back frame 1.

The posture holding member 20 according to the present embodiment is a member in which a resin is formed in an approximately rectangular plate shape, and claw portions (not shown) that engage with wires 21 and 22 are formed in an upper area and a lower area of the rear side of the posture holding member 20.

The posture holding member 20 according to the present embodiment is supported by coupling members. In other words, the two wires 21 and 22, which serve as the coupling members, are provided spanning between the side frames 15, and engage with the posture holding member 20 using the claw portions (not shown) formed in predetermined locations in the upper area and lower area of the rear side of the posture holding member 20; the two wires 21 and 22 disposed in this manner support the posture holding member 20 behind the cushion pad 1a. The wires 21 and 22 are formed from steel linear members having spring force.

As shown in FIG. 2, both ends of the two wires 21 and 22 engaged with the posture holding member 20 in the present embodiment are axially supported by axial support portions 37 and 38 provided in the stated side frames 15. Any known technique can be employed for the axial support portions 37 and 38 as long as the portions axially support the wires 21 and 22 in a rotatable state. Note that instead of the axial support portions 37 and 38, holes may be formed in the side plates of the side frames 15, and the ends of the wires 21 and 22 may be inserted into these holes in a rotatable state and then be processed to avoid pulling out.

Furthermore, although the present embodiment describes the posture holding member 20 comprising a plate and the wires 21 and 22 as a member that spans between the side frames 15, the configuration may of course include an S spring, a mat, a function for lumbar support, and so on.

Figure 3:
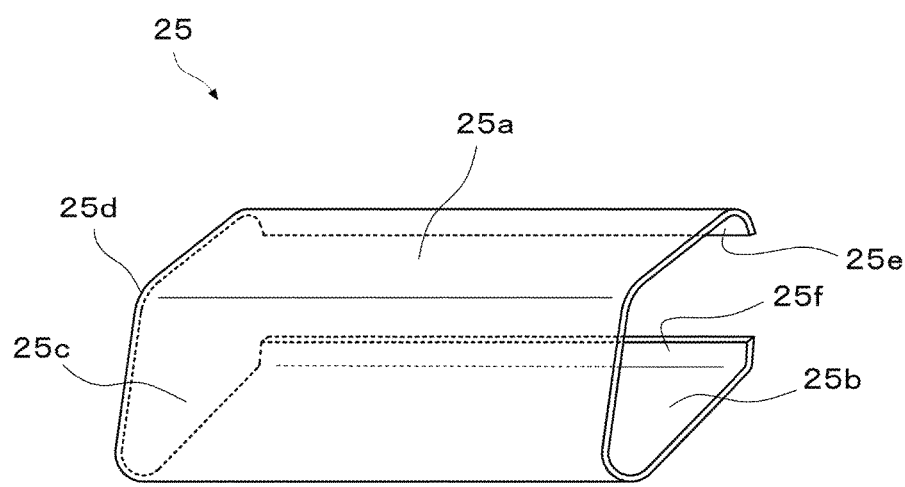
FIG. 3 is an overall perspective view of a lower back advancement inhibiting member according to the first embodiment of the present invention.

Hereinafter, a method for joining the lower back advancement inhibiting member 25 to the lower frame 17 and the configuration of the lower back advancement inhibiting member 25 according to the first embodiment will be described in detail using FIGS. 3 through 5. FIG. 3 is an overall perspective view of the lower back advancement inhibiting member 25, FIG. 4 is an overall perspective view of the seat back frame, and FIG. 5 is an explanatory diagram illustrating a side frame and the lower back advancement inhibiting member.

In the first embodiment, the lower back advancement inhibiting member 25 is, as shown in FIG. 3, formed having a hollow, approximately rectangular column shape, and part of a side surface thereof is cut out. The lower back advancement inhibiting member 25 is joined to the lower frame 17 so that an upper surface 25a is located on the top, a lower surface 25b is located on the bottom, and a front surface 25c is located toward the front of the seat frame F (the seat back frame 1), or, in other words, toward the side where the occupant sits. The upper surface 25a and the lower surface 25b have an upper joining surface 25e and a lower joining surface 25f, respectively, that are joined to the lower frame 17. The upper joining surface 25e has a shape in which the end of the upper surface 25a has been bent downward, whereas the lower joining surface 25f has a shape in which the end of the lower surface 25b has been bent upward.

A corner portion 25d formed between the upper surface 25a and the front surface 25c is preferably formed having a contour (an arc shape) that bulges gradually from the top, as such a shape makes it possible to guide the recline of the occupant. The corner portion 25d is a portion that stops the lower back region of the occupant from sinking backward during a rear-end collision, and thus it is preferable to design the radius of the arc to be large, as doing so makes it possible to guide the tilting of the occupant with more certainty.

As shown in FIG. 4, the lower back advancement inhibiting member 25 is joined to the lower frame 17 to protrude toward the front of the seat back frame 1, or in other words, toward the side where the occupant sits. Here, although the reclining shaft 11a is disposed to pass through the interior of the lower back advancement inhibiting member 25, the reclining shaft 11a is disposed in a location where the reclining shaft 11a does not make contact with the lower back advancement inhibiting member 25. Accordingly, when the reclining shaft 11a rotates, that rotation is not inhibited by the lower back advancement inhibiting member 25, and thus there is no loss of reclining functionality.

In addition, as in the present first embodiment, it is particularly preferable for the lower back advancement inhibiting member 25 to include the upper joining surface 25e and lower joining surface 25f that are joined in a state overlapping with the lower frame 17, and it is particularly preferable for the upper joining surface 25e to be joined to the upper end of the lower frame 17 and for the lower joining surface 25f to be joined to the lower end of the lower frame 17.

In this manner, joining surfaces are formed in the lower back advancement inhibiting member 25, and these two joining surfaces are joined to the end of the lower frame 17 while overlapping therewith; this improves the strength of the surface joints. Through this configuration, loads from above in particular can be received not only by the lower back advancement inhibiting member 25 but also by the upper end portion of the lower frame 17, which makes it possible to provide a vehicle seat S that has a stronger lower back advancement inhibiting member 25.

No particular restrictions are placed on the order in which the lower back advancement inhibiting member 25 is attached; the seat frame F may be assembled by first joining the reclining shaft 11a to the lower frame 17 as an integrated member and then passing the reclining shaft 11a through the hollow portion of the lower back advancement inhibiting member 25, or the seat frame F may first be assembled by linking the seat back frame 1 and the seating frame 2 via the reclining mechanism 11 and then installing the lower back advancement inhibiting member 25 to the lower frame 17 from the front of the seat frame F.

The lower back advancement inhibiting member 25 may have a set size as long as the configuration is such that the lower back advancement inhibiting member 25 is disposed in approximately the center of the middle portion 17b; the lower back advancement inhibiting member 25 is thus compatible with seat back frames 1 of a variety of sizes, and is therefore highly generic. In other words, it is only necessary to form a single type of lower back advancement inhibiting member 25 as long as the member is of a size and is disposed in a location that makes it possible to support the lower back region of the occupant, even if the member is to be provided in seat back frames 1 of a variety of sizes.

As shown in FIG. 3 and FIG. 4, the lower back advancement inhibiting member 25 is formed as a hollow rectangular column, and is furthermore formed so that part of the side surface thereof is cut out, and the section of the lower back advancement inhibiting member 25 is formed in approximately a distorted squared U-shape. The lower frame 17 of the seat back frame 1 is engaged with the inner side of the lower back advancement inhibiting member 25, and the lower back advancement inhibiting member 25 and the lower frame 17 are fixedly jointed together at their surfaces. Although FIG. 5 through FIG. 7 illustrates an example in which the lower back advancement inhibiting member 25 is formed having a section of an approximately distorted squared U-shape, it should be noted that the lower back advancement inhibiting member 25 may comprise only the upper surface 25a, as long as the member is joined to the lower frame 17 and does not make contact with other constituent elements such as the reclining shaft 11a. Furthermore, the member may be formed so that the side surface is rectangular, approximately circular, or approximately oval.

By employing a hollow shape in this manner, the advancement of the lower back region of the occupant is suppressed; furthermore, in the particular case where the side frames 15, the extension portions 17a, 17a, or the like have deformed toward the inner side under a sideways load caused by a side collision, the right and left extension portions 17a, 17a make contact with the ends on the sides of the lower back advancement inhibiting member 25. In this case, because the lower back advancement inhibiting member 25 has an approximately squared U-shaped cross-section, the lower back advancement inhibiting member 25 has a higher degree of structural strength in the horizontal direction than a lower back advancement inhibiting member configured only of the upper surface 25a. Accordingly, the lower back advancement inhibiting member 25 is highly resistant to deformation under stress acting in the horizontal direction, as is found during side collisions and the like, and thus the seat frame F can be prevented from deforming.

As shown in FIG. 5, the lower back advancement inhibiting member 25 includes at least the front surface 25c extending toward the front side, and it is preferable for the lower side of the front surface 25c to bulge forward more than the upper side of the front surface 25c. In other words, it is preferable for the front surface 25c of the lower back advancement inhibiting member 25 to be formed to bulge further forward than the position of the corner portion 25d (the line labeled "A" in FIG. 5). By employing a configuration in which the lower side of the front surface 25c is tilted forward, it is easier to ensure that the body of the occupant tilts backward during a rear-end collision than when employing a lower back advancement inhibiting member 25 of which front surface 25c is not tilted. As a result, less time is required for the head region of the occupant to make contact with the headrest, which makes it possible to reduce the load exerted on the neck region of the occupant.

Furthermore, preferably, the posture holding member 20 is further provided, disposed between the side frames 15 (side members) and maintaining the posture of the occupant, and the lower back advancement inhibiting member 25 is disposed to bugle further forward than the front end of the posture holding member 20. In other words, it is preferable for the upper surface 25a to be formed extending further forward than the front end, or the forwardmost location, of the posture holding member 20 (the line labeled "B" in FIG. 5). By employing a configuration in which the lower back advancement inhibiting member 25 bulges forward further than the posture holding member 20 that supports the body (back) of the occupant in this manner, the lower back region of the occupant can be brought into contact with the lower back advancement inhibiting member 25 before the back of the occupant sinks into the posture holding member 20. As a result, the occupant tilts backward quickly during a rear-end collision, which makes it possible to reduce the load on the neck region.

By employing this configuration, when the lower back region of the occupant has moved in a sinking manner, the amount by which the body of the occupant (the area above the lower back region; the upper area of the torso region) moves backward can be increased, the upper body can be tilted backward, and the neck region and head region can be induced to move in tandem with the upper body.

The lower back advancement inhibiting member 25 is formed of a metal plate having a predetermined thickness, and it is assumed here that the metal used is of a strength and hardness that can withstand a load during a rear-end collision. Note that another material may of course be used for the lower back advancement inhibiting member 25 as long as that material can be favorably fixedly jointed to the lower frame 17 and has a resilience that is greater than the load generated by the occupant when an impact has been applied from the rear of the vehicle, or in other words, has a strength that can withstand a load during a rear-end collision.

In addition, the strength of the lower back advancement inhibiting member 25 can be adjusted by selecting the plate thickness, material, or the like as appropriate. For example, increasing the thickness of the lower back advancement inhibiting member 25 results in a lower back advancement inhibiting member 25 having a strength sufficient to prevent the lower back region from sinking even in the case where the lower back region of the occupant has suddenly moved backward during a rear-end collision.

As shown in FIG. 3 and FIG. 5, the lower back advancement inhibiting member 25 includes the front surface 25c toward the front of the seat frame F, the upper surface 25a on the upper side, and the lower surface 25b on the lower side, and the upper surface 25a and lower surface 25b are disposed to be joined to the middle portion 17b of the lower frame 17. Here, the upper surface 25a and the lower surface 25b have the upper joining surface 25e and the lower joining surface 25f, respectively, fixedly jointed to areas that overlap with the portions where the middle portion 17b is bent toward the front of the seat frame F. Welding, riveting, bolting, spot welding, and so on can be given as methods for the fixing and joining.

Although the present embodiment describes a shape in which the upper joining surface 25e and the lower joining surface 25f, which are shaped by bending the ends of the upper surface 25a and the lower surface 25b, respectively overlap with the upper end and lower end of the middle portion 17b, it is not necessary for the ends of the upper surface 25a and the lower surface 25b of the lower back advancement inhibiting member 25 to have a bent shape, and the ends or the edges of the upper surface 25a and the lower surface 25b may be directly joined to the surface of the middle portion 17b.

The upper joining surface 25e and the lower joining surface 25f of the lower back advancement inhibiting member 25 extend along the lengthwise direction of the middle portion 17b of the lower frame 17, are welded and joined to continue from the upper and lower areas, respectively, of the middle portion 17b, and welding portions are connected at the joining areas. The dimension of the lower back advancement inhibiting member 25 in the horizontal direction is adjusted to a length that allows the right and left ends thereof to be separated from both of the side frames 15 (and more specifically, the extension portions 17a, 17a on either side of the lower frame 17) by a predetermined distance. Employing such a configuration makes it possible to dispose members such as an actuator (reclining motor) between the lower back advancement inhibiting member 25 and the extension portions 17a, 17a on either side of the lower frame 17, and is thus favorable.

Effects of disposing the lower back advancement inhibiting member 25 to be slightly distanced from the inner sides of the right and left extension portions 17a, 17a will now be described.

With the seat back frame 1 described above, the lower back region of the occupant moves backward during a rear-end collision but is stopped by the lower back advancement inhibiting member 25. Then, in the case where the lower back advancement inhibiting member 25 is provided to continue from the extension portions 17a, 17a of the lower frame 17, the impact from the occupant is transmitted to the side frames 15 through the extension portions 17a. As a result, the seat back frame 1 will tilt backward and there will be a greater distance until the head region of the occupant makes contact with the headrest S3 provided at the top of the seat back frame 1, and thus it is not possible to suppress only the head region from suddenly moving backward.

However, by disposing the lower back advancement inhibiting member 25 to be slightly distanced from the inner sides of the extension portions 17a, 17a as here, even if the lower back region of the occupant suddenly moves backward during a rear-end collision, not much of that impact is transmitted to the side frames 15. Accordingly, the seat back frame 1 can be prevented from tilting backward, the head region of the occupant can easily be brought into contact with the headrest S3, and the load exerted on the neck region of the occupant can be dissipated.

Second Embodiment

Hereinafter, a method for joining a lower back advancement inhibiting member 26 to the lower frame 17 and the configuration of the lower back advancement inhibiting member 26 according to a second embodiment will be described in detail using FIGS. 6 through 8. FIG. 6 is an overall perspective view of the lower back advancement inhibiting member 26, FIG. 7 is an overall perspective view of the seat back frame, and FIG. 8 is an explanatory diagram illustrating a side frame and the lower back advancement inhibiting member.

As opposed to the lower back advancement inhibiting member 25 of the first embodiment, in which part of the rear surface is cut out, the lower back advancement inhibiting member 26 according to the second embodiment is characteristic in that a rear surface 26g is provided. Because the configuration and effects aside from the configuration of the lower back advancement inhibiting member 26 and the method for attaching the lower back advancement inhibiting member 26 to the lower frame 17 are the same as with the lower back advancement inhibiting member 25 of the first embodiment, descriptions thereof will be omitted.

In the second embodiment, the lower back advancement inhibiting member 26 is, as shown in FIG. 6, formed having a hollow, approximately rectangular column shape. The lower back advancement inhibiting member 26 is joined to the lower frame 17 so that an upper surface 26a is located on the top, a lower surface 26b is located on the bottom, a front surface 26c is located toward the front of the seat frame F (the seat back frame 1), and the rear surface 26g is located toward the rear of the seat frame F.

Here, unlike the first embodiment in which the lower frame 17 is inserted into and joined with the cut-out area, in the second embodiment, part of the middle portion 17b of the lower frame 17 is cut and removed, and part or all of an edge (a side on the side surface) 26h of the rear surface 26g is joined to the cut surface of the middle portion 17b.

Although FIG. 7 illustrates a case in which part of the edge 26h (see FIG. 6) is joined, in the case where the entire edge 26h is joined to the cut surface of the middle portion 17b, the shape of the lower back advancement inhibiting member 26 or the shape of the middle portion 17b is changed and adjusted so that the lower back advancement inhibiting member 26 is disposed so as not to make contact with the reclining shaft 11a. Alternatively, the shape of the lower frame 17 may be changed.

Note that joining an area of the middle portion 17b that is bent toward the front of the seat frame F to the upper surface 26a in an integrated manner increases the strength of the joint with a rear joining surface 26i, and is thus preferable.

In addition, as in the first embodiment, it is preferable for a corner portion 26d formed by the upper surface 26a and the front surface 26c to be formed having a contour (an arc shape) that bulges gradually from the top.

Furthermore, although the surface of the front surface 26c is essentially formed along the vertical direction and is formed to be approximately parallel to the lower frame 17 in the second embodiment, the front surface 26c of the lower back advancement inhibiting member 26 may be configured to tilt in the same manner as in the first embodiment.

As shown in FIG. 7, the lower back advancement inhibiting member 26 is joined to the lower frame 17 to protrude toward the front of the seat back frame 1. Here, the reclining shaft 11a is disposed to pass through the interior of the lower back advancement inhibiting member 26. In other words, the reclining shaft 11a is disposed in a position where the reclining shaft 11a does not make contact with the lower back advancement inhibiting member 26. Accordingly, when the reclining shaft 11a rotates, that rotation is not inhibited by the lower back advancement inhibiting member 26, and thus there is no loss of reclining functionality.

With respect to the order for attaching the lower back advancement inhibiting member 26, first, an area in approximately the center of the middle portion 17b of the lower frame 17 that is of a length that allows the rear surface 26g to be inserted is cut out so that the lower back advancement inhibiting member 26 can be inserted; that cut surface is then joined to the lower back advancement inhibiting member 26, resulting in an integrated member. Next, the reclining shaft 11a is inserted into the hollow area of the lower back advancement inhibiting member 26, and the seat frame F is assembled. At this time, the lower back advancement inhibiting member 26 may be attached with the lower frame 17 alone being handled independently, or the lower back advancement inhibiting member 26 may be attached after first anchoring the extension portions 17a of the lower frame 17 to the side frames 15 in advance.

The lower back advancement inhibiting member 26 is attached so that the middle portion 17b of the lower frame 17 and the rear surface 26g are continuous with each other. In other words, the lower back advancement inhibiting member 26 is welded and joined to the lower frame 17 through the rear joining surface 26i, which serves as the end of the rear surface 26g. In addition, the dimension of the lower back advancement inhibiting member 26 in the horizontal direction is also adjusted to a length that allows the right and left ends thereof to be separated from both of the extension portions 17a, 17a on either side of the lower frame 17.

When cutting the middle portion 17b, changing and adjusting the location of the cut makes it possible to use a lower back advancement inhibiting member 26 having a set size; the lower back advancement inhibiting member 26 is thus compatible with seat back frames 1 of a variety of sizes, and is therefore highly generic. In other words, it is only necessary to form a single type of lower back advancement inhibiting member 26 as long as that member is of a size and is disposed in a location making it possible to support the lower back region of the occupant, even if the member is to be provided in seat back frames 1 of a variety of sizes.

As shown in FIG. 6 and FIG. 8, the lower back advancement inhibiting member 26 is formed as a hollow column having side surfaces that are approximately rectangular in shape. Furthermore, as shown in FIG. 7, the rear surface 26g of the lower back advancement inhibiting member 26 is fixedly jointed to the middle portion 17b of the lower frame 17 in an integrated manner. Although FIG. 6 through FIG. 8 illustrate an example in which the lower back advancement inhibiting member 26 is formed to be approximately rectangular in shape, it should be noted that the side surfaces thereof may be formed to be approximately circular or approximately oval in shape as long as the shape can be joined to the lower frame 17 and does not make contact with other constituent elements such as the reclining shaft 11a.

The lower back advancement inhibiting member 26 is formed of a metal plate having a predetermined thickness, and it is assumed here that the metal used is of a strength and hardness that can withstand a load during a rear-end collision. However, another material may of course be used for the lower back advancement inhibiting member 26 as long as that material can be favorably welded to the lower frame 17 and has a resilience that is greater than the load generated by the occupant when an impact has been applied from the rear of the vehicle, or in other words, has a strength that can withstand a load during a rear-end collision.

In addition, the strength of the lower back advancement inhibiting member 26 can be adjusted by selecting the plate thickness, material, or the like as appropriate. For example, increasing the thickness of the lower back advancement inhibiting member 26 results in a lower back advancement inhibiting member 26 having a strength sufficient to prevent the lower back region from sinking even in the case where the lower back region of the occupant has moved suddenly backward during a rear-end collision.

Although the lower back advancement inhibiting member 26 that is formed having a hollow column shape is fixedly jointed to the cut surface of the lower frame 17 in the present embodiment, the configuration may be such that the lower frame 17 is not cut and the rear surface 26g is fixedly jointed to the middle portion 17b of the lower frame 17.

Third Embodiment

Hereinafter, the configuration of a lower back advancement inhibiting member 27 according to a third embodiment will be described in detail using FIG. 9. FIG. 9 is an overall perspective view of a seat back frame.

Unlike the lower back advancement inhibiting member 25 according to the first embodiment, in which the upper surface 25a, the lower surface 25b, and the front surface 25c are formed of a continuous plate member, the lower back advancement inhibiting member 27 according to the third embodiment is characteristic in that an upper surface 27a, a lower surface 27b, and a front surface 27c are formed to be split at the center of the lower back advancement inhibiting member 27. Configurations and effects aside from the lower back advancement inhibiting member 27 being split are the same as those of the lower back advancement inhibiting member 25 according to the first embodiment, and thus descriptions thereof will be omitted.

In the third embodiment, the lower back advancement inhibiting member 27 is, as shown in FIG. 9, formed having a relief area in what is approximately the center thereof. This relief area is designed so that there is no plate member in what is approximately the center of the lower back advancement inhibiting member 27, and is formed by, for example, splitting the lower back advancement inhibiting member 27. By employing such a configuration, the spinal column of the occupant can advance into the relief area when the lower back region of the occupant sinks backward, and thus the spinal column does not make contact with the lower back advancement inhibiting member 27. As a result, even if the lower back region of the occupant has moved backward, or in other words, has moved toward the lower back advancement inhibiting member 27, a load placed on the spinal column by the lower back advancement inhibiting member 27 can be suppressed.

Although the present embodiment describes the lower back advancement inhibiting member 27 as being split only in what is the approximate center thereof, it should be noted that splits may be provided in other locations as there is an empty space in what is the approximate center. Increasing the number of splits makes it possible to reduce the amount of plate material used to form the lower back advancement inhibiting member 27, which in turn makes it possible to achieve a lighter seat back frame 1.

In addition, although the present embodiment describes an example in which the lower back advancement inhibiting member 27 is split in what is approximately the center thereof, the relief area may be formed so that the vicinity of the position in the lower back advancement inhibiting member 27 that corresponds to the spinal column of the occupant is located further back than the other positions or is recessed downward by a level. In other words, the configuration may be such that a recess extending parallel to the edges of the lower back advancement inhibiting member 27 is provided in the upper surface 27a and in the front surface 27c.

Furthermore, the relief area may be formed by cutting out part of the upper surface 27a and the front surface 27c in the vicinity of the locations thereof that correspond to the spine of the occupant.

Fourth Embodiment

Hereinafter, the configuration of a lower back advancement inhibiting member 28 according to a fourth embodiment will be described in detail using FIG. 10. FIG. 10 is an overall perspective view of a seat back frame.

Unlike the lower back advancement inhibiting member 25 according to the first embodiment, in which the upper surface 25a is formed from a flat smooth plate member, the lower back advancement inhibiting member 28 according to the fourth embodiment is characteristic in that a groove-shaped impact absorption portion 28j is formed in an upper surface 28a. Other configurations and effects aside from the impact absorption portion 28j are the same as those in the lower back advancement inhibiting member 25 according to the first embodiment, and thus descriptions thereof will be omitted.

In the fourth embodiment, the lower back advancement inhibiting member 28 includes the impact absorption portion 28j, in which the upper surface 28a is partially recessed, as shown in FIG. 10. The impact absorption portion 28j is formed as a groove (recess) that continues in the horizontal direction of the seat back frame 1 and that extends approximately parallel to a corner portion 28d or the reclining shaft 11a.

When an impact greater than that which the impact absorption portion 28j has been set for occurs during a rear-end collision, the impact absorption portion 28j deforms when the load of the occupant is exerted on the lower back advancement inhibiting member 28, and the lower back advancement inhibiting member 28 distorts, making it possible to absorb the impact. Although the present embodiment describes an example of a configuration in which the impact absorption portion 28j is provided only in the upper surface 28a, the impact absorption portion 28j may be provided in both the upper surface 28a and a lower surface 28b, or may be provided only in the lower surface 28b.

However, it is preferable for the impact absorption portion 28j to be formed only in the upper surface 28a. By employing such a configuration, the tilt of a front surface 28c can be increased more during a rear-end collision as a result of the impact absorption portion 28j deforming. In other words, the lower side of the front surface 28c extends further forward and the tilt thereof increases when the impact absorption portion 28j deforms, and thus the occupant can be induced to tilt backward more easily.

Accordingly, because the plate member of which the impact absorption portion 28j is configured allows the impact absorption portion 28j to deform when an excessive impact load is exerted thereon, it is preferable for the impact absorption portion 28j to be formed of a thinner plate member than the plate member of which the other surfaces (the upper surface 28a) are configured.

Figure 11A:
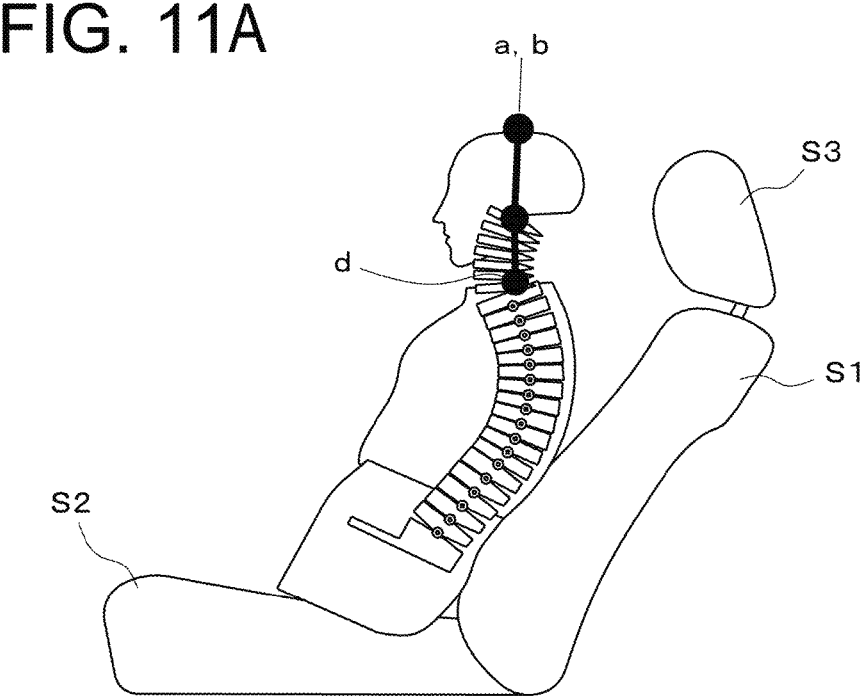
FIGS. 11A and 11B are explanatory side-view diagrams illustrating movement of an occupant according to a conventional technique.
Figure 11B:
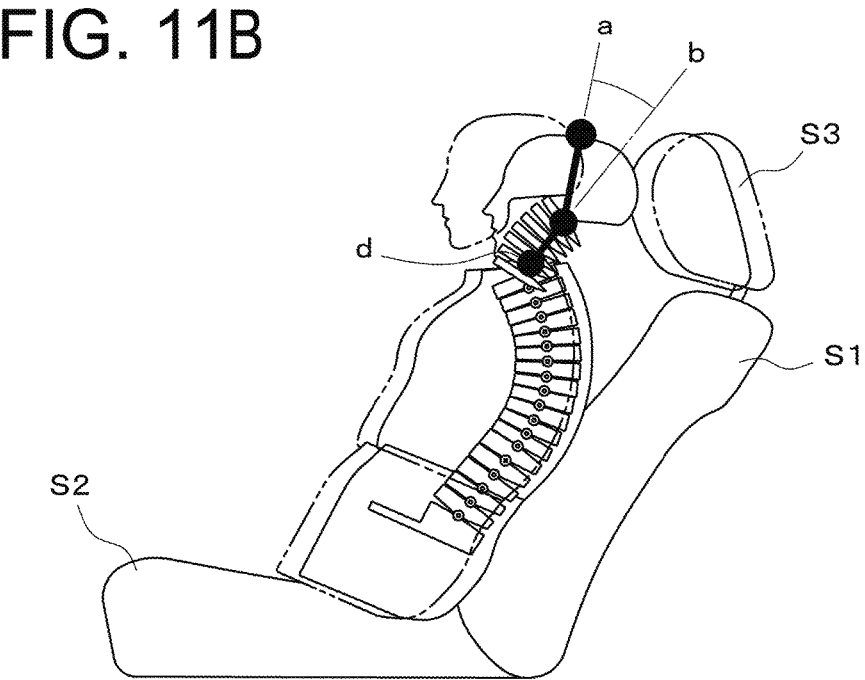
Figure 12A:
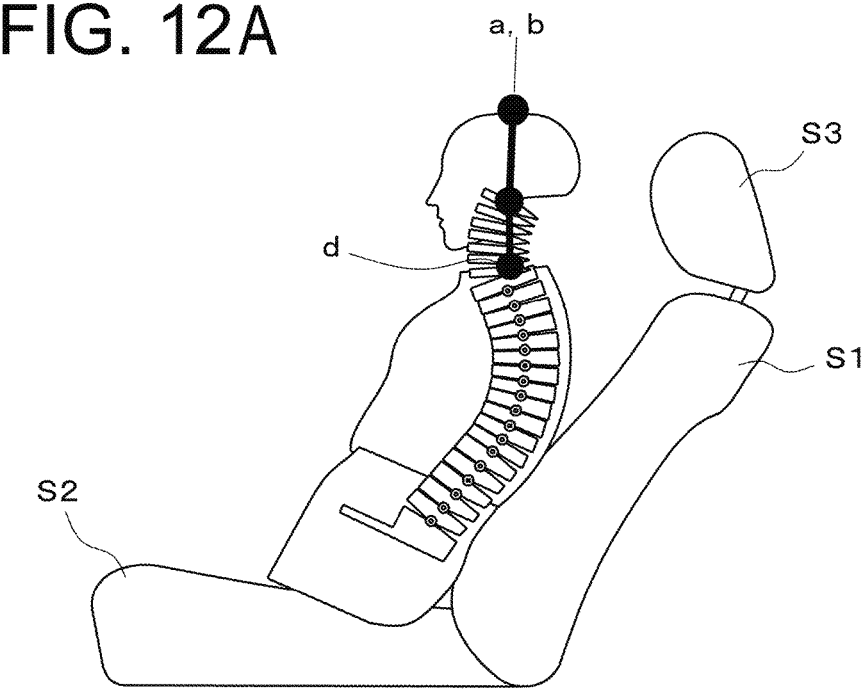
FIGS. 12A and 12B are explanatory side-view diagrams illustrating movement of an occupant according to embodiments of the present invention.
Figure 12B:
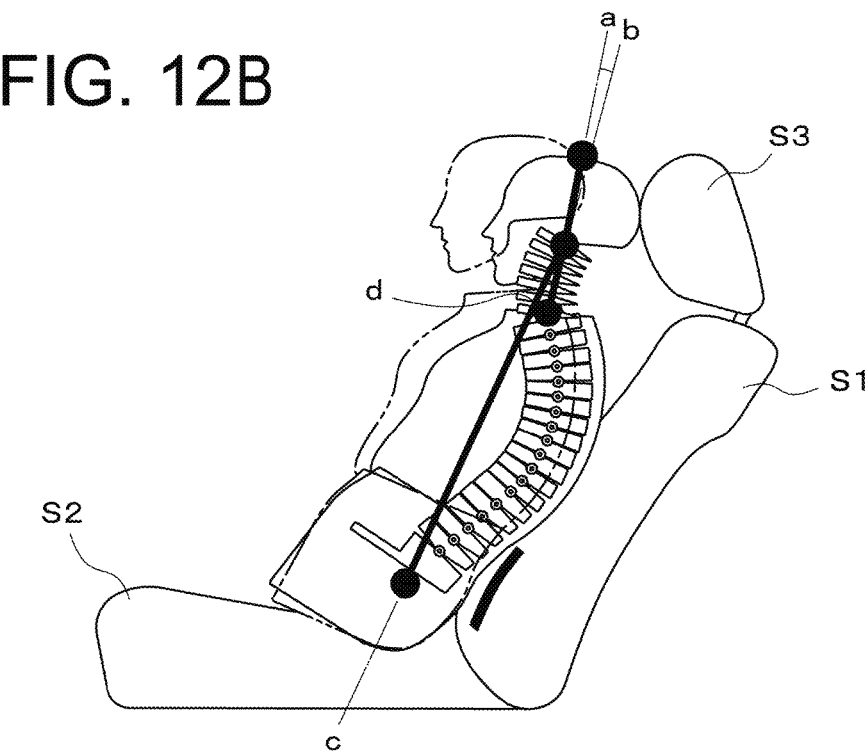

Next, effects of the lower back advancement inhibiting members 25, 26, 27, and 28 during a rear-end collision will be described in detail based on FIGS. 11A through 12B. FIG. 11A is an explanatory diagram illustrating an occupant in a seated position when sitting normally according to a conventional technique; FIG. 11B is an explanatory diagram illustrating an occupant seated in a vehicle seat provided with an active headrest during a rear-end collision according to the conventional technique; FIG. 12A is an explanatory diagram illustrating an occupant in a seated position when sitting normally according to the present embodiments; and FIG. 12B is an explanatory diagram illustrating an occupant seated in the vehicle seat S of embodiments of the present invention during a rear-end collision. In FIGS. 11B and 12B, the phantom line indicates the normal position of the occupant or the headrest S3.

The line connecting the top of the occupant's head region to the connection point between the head region and the neck region is illustrated as a line a, the line connecting the connection point between the head region and the neck region to the connection point between the neck region and the torso region is illustrated as a line b, the line connecting the connection point between the head region and the neck region to the lower back region is illustrated as a line c, and the connection point between the neck region and the torso region is illustrated as a point d.

As shown in FIG. 11A and FIG. 12A, generally, when the occupant is seated in the vehicle seat S, he or she is seated so that his or her back, including the lower back region, makes contact with the seat back S1. In this manner, the normal seating load is generally exerted toward the rear of the vehicle seat S.

When the vehicle experiences a large impact from the rear, the upper body of the occupant is pushed forward due to the impact load that is greater than the normal seating load; then, the head region suddenly tilts backward at a higher velocity than the velocity at which the upper body from the shoulders down (the torso region) sinks into the seat back S1. As a result, as shown in FIG. 11B, the neck region tilts backward central to the base of the neck region, or in other words, the connection point d between the neck region and the torso region; as a result of this movement, the angle between the line a and the line b increases, producing a movement in which the neck region bends backward (backward and downward), which in turn results in the neck region receiving a large load.

In response to this movement of the occupant, with a technique such as that illustrated in FIG. 11B that uses a conventional active headrest or a technique that causes the upper body to sink and thus brings the head region of the occupant into contact with the headrest, the head region is stopped by the headrest S3, which reduces the backward movement of the head region. However, depending on the posture of the occupant, the angle between the line a and the line b will change significantly from the angle found during normal seating, as described above; there has thus been a risk that a burden will be placed on the neck region of the occupant.

However, with a vehicle seat S configured to stop the backward movement of the lower back region, as is the case with the vehicle seat S provided with the lower back advancement inhibiting members 25, 26, 27, and 28 according to embodiments of the present invention, if the lower back region of the occupant begins to sink backward, the lower back advancement inhibiting members 25, 26, 27, and 28 push the lower back region forward again. Accordingly, during a rear-end collision, the amount by which the upper torso region of the occupant (the area of the torso region in the vicinity of the chest) sinks becomes relatively greater, and the upper body tilts backward; as a result, the neck region and the head region move in tandem with the upper body. In other words, it is possible to ensure that the occupant moves in a state in which his or her neck is straight. At this time, the connection point between the neck region and the torso region (the point d) is located further to the rear than the line c, and thus the back of the occupant remains curved.

Note that the "upper torso region" preferably refers to a location corresponding to the chest region, and it is preferable for this area to be caused to sink toward the seat back S1. More specifically, it is further preferable for the "chest region" to refer to the first through sixth dorsal vertebrae of the occupant, and for the location of the fourth dorsal vertebra to be caused to sink furthest backward.

Therefore, the vehicle seat S is provided with the neck-burden reduction element (the lower back advancement inhibiting members 25, 26, 27, and 28 in the present embodiments), which, during a rear-end collision, ensures a greater amount of backward movement of the connection point between the neck region and the torso region (the point d) than the amount of backward movement of the lower torso region and causes the upper torso region to sink into the seat back S1.

Accordingly, the amount of change in the angle between the line a and the line b from when the occupant is seated normally to when a rear-end collision has occurred is reduced. As a result, the burden placed on the neck region can be reduced, and the load exerted on the occupant during a rear-end collision can be suppressed.

In addition, it is preferable for the neck-burden reduction element to be configured to move the connection point between the torso region and the neck region (the point d) so that the point d is located further to the rear than the line that connects the connection point between the head region and the neck region of the occupant to the lower back region of the occupant. Furthermore, it is preferable for the neck-burden reduction element to guide the occupant so that the upper torso region of the occupant has a greater amount of backward movement than the central torso region. This makes it possible to ensure an amount of backward movement for the connection point between the torso region in the neck region (the point d) and cause the occupant to tilt backward.

In addition, it is preferable for the neck-burden reduction element to be disposed to the rear of the lower back region of the occupant, and for this element to be a movement amount suppression member that suppresses the backward movement of the lower back region. By employing a configuration that stops the lower back region in this manner, it is possible to support the lower back region in a stable manner, which in turn makes it possible to improve the neck-burden reduction effects.

Although a mechanism that causes the headrest S3 to move forward, a mechanism that causes the back to sink into the seat back S1 and brings the head region into contact with the headrest S3 as a result, and the like have been proposed as mechanisms for suppressing movement of the head region and reducing the load on the neck region during a rear-end collision, it is not necessary to employ this type of complicated mechanism.

It is possible to reduce the load exerted on the neck region during a rear-end collision by employing a simple configuration that simply adds the lower back advancement inhibiting members 25, 26, 27, and 28. Accordingly, it is possible to provide a vehicle seat S with a small number of components and lightweight in an inexpensive manner.

Although the aforementioned embodiments describe the seat back S1, which is a front seat in an automobile as a specific example, the present invention is not limited thereto, and the same configurations can of course be applied in the seat backs of the rear seat as well.

TABLE OF REFERENCE CHARACTERS

| S: | vehicle seat |
| --- | --- |
| S1: | seat back |
| S2: | seating portion |
| S3: | headrest |
| F: | seat frame |
| 1: | seat back frame |
| 2: | seating frame |
| 1a, 2a, 3a: | cushion pad (padding material) |
| 1b, 2b, 3b: | skin material |

-continued

TABLE OF REFERENCE CHARACTERS

| 11: | reclining mechanism | |
| --- | --- | --- |
| | 11a: | reclining shaft |
| 15: | side frame (side portion) | |
| 15a: | inward extension portion | |
| 16: | upper frame (upper portion) | |
| | 16a: | side surface |
| 17: | lower frame (lower portion) | |
| | 17a: | extension portion |
| | 17b: | middle portion |
| | 17c: | flange |
| | 17d: | inclined portion |
| 18: | pillar support portion | |
| 19: | headrest pillar | |
| 20: | posture holding member | |
| 21, 22: | wire (coupling member) | |
| 25, 26, 27, 28: | lower back advancement inhibiting member (neck-burden reduction element; lower portion; lower member) | |
| | 25a, 26a, 27a, 28a: | upper surface |
| | 25b, 26b, 27b, 28b: | lower surface |
| | 25c, 26c, 27c, 28c: | front surface |
| | 25d, 26d, 27d, 28d: | corner portion |
| | 25e: | upper joining surface |
| | 25f: | lower joining surface |
| | 26g: | rear surface |
| | 26h: | edge |
| | 26i: | rear joining surface |
| | 27e: | relief area |
| | 28j: | impact absorption portion |
| 37, 38: | axial support portion | |
| 51: | first space | |
| 52: | second space | |
| 53: | third space | |

What is claimed is:

1. A vehicle seat comprising:
    a seat back frame comprising:
        side portions located on both sides of the seat back frame;
        an upper frame disposed in an upper area of the seat back frame; and
        a lower frame disposed in a lower area of the seat back frame and extending between the side portions;
    a lower member disposed between the side portions and mounted on the lower frame; and
    a reclining shaft for a reclining mechanism;
    wherein:
        the lower member covers a front side of the reclining shaft in a seat front-to-rear direction;
        each end portion of the lower member in a seat right-to-left direction is separated from the side portions of the seat back frame; and
        a front surface of the lower member has a first front portion and a second front portion that is separated from the first front portion by a relief area.

2. The vehicle seat according to claim 1, wherein:
    each of the side portions comprises an inward extension portion at a front end of the side portion in the seat front-to-rear direction that extends toward an inner side of the seat; and
    the end portion of the lower member in the seat right-to-left direction is located on the inner side of the seat relative to an inner end of the inward extension portion.

3. The vehicle seat according to claim 1, wherein:
a pillar support portion is provided on the upper frame; and
an inclination angle of the pillar support portion relative to a vertical direction and an inclination angle of the front surface of the lower member relative to the vertical direction are different.

4. The vehicle seat according to claim 1, wherein:
the relief area is a split in the front surface of the lower member.

5. The vehicle seat according to claim 1, wherein:
the relief area is an empty space in the front surface of the lower member.

6. The vehicle seat according to claim 1, wherein:
the relief area is a recess in the front surface of the lower member.

7. A vehicle seat comprising:
a seat back frame comprising:
  side portions located on both sides of the seat back frame;
  an upper frame disposed in an upper area of the seat back frame; and
  a lower frame disposed in a lower area of the seat back frame and extending between the side portions; and
a lower member disposed between the side portions and mounted on the lower frame;
wherein:
  each end portion of the lower member in a seat right-to-left direction is separated from the side portions of the seat back frame by a first space between the end portion of the lower member and the side portion;
  the lower frame comprises a flange that is bent toward a seat front direction and extends along an upper edge of the lower frame;
  an end portion of the flange in the seat right-to-left direction is separated from the side portions of the seat back frame by a second space between the end portion of the flange and the side portion;
  a width of the second space in the seat right-to-left direction is smaller than a width of the first space in the seat right-to-left direction and a projection of the width of the second space onto the first space is within the width of the first space;
  the lower member comprises a front surface and an upper surface that extends rearward from an upper end of the front surface; and
  a rear end of the upper surface overlaps with the flange and is bent downward.

8. The vehicle seat according to claim 7, wherein:
the lower frame comprises an inclined portion at an upper edge portion thereof that is inclined relative to a horizontal direction; and
the inclined portion is located outside of the end portion of the lower member in the seat right-to-left direction.

9. The vehicle seat according to claim 7, wherein:
a third space is provided at a central portion of a front surface of the lower member in the seat right-to-left direction.

10. The vehicle seat according to claim 7, wherein:
the lower member comprises a front surface and an upper surface that extends rearward from an upper end of the front surface; and
the front surface is connected to the lower frame.

11. The vehicle seat according to claim 7, wherein:
the flange is located outside of the end portion of the lower member in the seat right-to-left direction.

\* \* \* \* \*